United States Patent
Koivukunnas et al.

(10) Patent No.: US 6,481,275 B1
(45) Date of Patent: Nov. 19, 2002

(54) METHOD AND APPARATUS FOR MEASURING THE TENSION OF A MOVING WEB

(75) Inventors: Pekka Koivukunnas, Järvenpää (FI); Timo Torvi, Järvenpää (FI)

(73) Assignee: Metso Paper Automation Oy, Tampere (FI)

( * ) Notice: Subject to any disclaimer, the term of this patent is extended or adjusted under 35 U.S.C. 154(b) by 0 days.

(21) Appl. No.: 09/720,706

(22) PCT Filed: Jun. 30, 1999

(86) PCT No.: PCT/FI99/00582
§ 371 (c)(1),
(2), (4) Date: Dec. 29, 2000

(87) PCT Pub. No.: WO00/02027
PCT Pub. Date: Jan. 13, 2000

(30) Foreign Application Priority Data

Jul. 1, 1998 (FI) .................................................. 981517

(51) Int. Cl.⁷ .................................................. G01L 5/04
(52) U.S. Cl. ..................................... 73/159; 73/862.637
(58) Field of Search ............................ 73/159, 862.581, 73/862.582, 862.621, 862.627, 862.637

(56) References Cited

U.S. PATENT DOCUMENTS

| | | | | |
|---|---|---|---|---|
| 3,845,434 A | * | 10/1974 | Carter | 73/159 |
| 3,861,207 A | * | 1/1975 | Barbee | 73/159 |
| 4,130,014 A | * | 12/1978 | Eddens | 73/144 |
| 4,300,714 A | | 11/1981 | Dahl et al. | |
| 4,674,341 A | * | 6/1987 | Koenig | 73/862.48 |
| 5,052,233 A | | 10/1991 | Rantala | |
| 5,275,062 A | * | 1/1994 | Turley | 73/862.391 |
| 5,275,348 A | * | 1/1994 | Looser | 242/413.1 |
| 5,301,866 A | | 4/1994 | Veh et al. | |
| 5,365,796 A | * | 11/1994 | Lin et al. | 73/862.391 |
| 5,663,510 A | * | 9/1997 | Niemann et al. | 73/159 |
| 5,837,910 A | * | 11/1998 | Beijbom et al. | 73/862.46 |

FOREIGN PATENT DOCUMENTS

| | | |
|---|---|---|
| CA | 1 265 940 | 2/1990 |
| DE | 43 01 618 A1 | 5/1994 |
| WO | WO91/03600 A1 | 3/1991 |

OTHER PUBLICATIONS

PCT International Search Report, PCT/FI99/00582, completed Nov. 19, 1999.
Copy of Finnish Office Action, Appl. No. 981517, dated Aug. 18, 1999.

* cited by examiner

Primary Examiner—M. Noori
(74) Attorney, Agent, or Firm—Alston & Bird LLP

(57) ABSTRACT

The invention relates to a method and apparatus for measuring the tension of a moving web. In the invention, a measuring beam (2) is curved so that a web moving over or under the measuring beam (2) forms an air cushion (3) of the air it transports between the measuring beam (2) and the web (1). The web (1) causes a force effect transmitted by the air cushion on the measuring beam (2). The tension of the web (1) is measured by measuring the force caused by the web (1) and transmitted by the measuring beam (2).

11 Claims, 1 Drawing Sheet

METHOD AND APPARATUS FOR MEASURING THE TENSION OF A MOVING WEB

FIELD OF THE INVENTION

A method for measuring the tension of a moving web, in which method the moving web is directed over or under a curved measuring beam in such a way that the web forms an air cushion of the air it transports between the web and the measuring beam, whereby the web moves over the measuring beam on the air cushion causing a force effect transmitted by the air cushion on the measuring beam.

The invention further relates to an apparatus for measuring the tension of a moving web, which apparatus comprises a curved measuring beam so that the moving web directed over or under the measuring beam forms an air cushion of the air it transports between the web and the measuring beam and the web moving over the measuring beam on the air cushion causes a force effect transmitted by the air cushion on the measuring beam.

BACKGROUND OF THE INVENTION

When manufacturing paper, the formed and ready paper web is rolled at several stages of the process. For instance, at the end of the process, the web is rolled into large rolls several meters in diameter. The tension of the rolls should remain the same both in the longitudinal direction of the web and in the vertical direction of the roll so as to make the paper behave in as similar a way as possible in the process of the end-user, for example a printing house, independent of what part of the roll the printed sheet has been taken from. In addition, when winding the web from one roll to another, the rotation speeds of the rolls and the torques winding the rolls need to be adjusted to be suitable in relation to each other, because when the diameter of the roll changes, also the circumferential speed of the roll changes. To be able to wind the web in a roll so that the tension of the web is suitable throughout the roll and to be able to wind the web from one roll to another without loosening or tightening the web too much and breaking it, the tension of the web must be measured during winding and the rotation speeds of the rolls adjusted according to the measured tension data. A tension measuring instrument also quickly indicates a break in the web.

Canadian Patent 1 265 940 discloses a solution for measuring web tension. In the solution, the web is brought in contact with a measuring element comprising several contiguous short rolls or several contiguous support elements including a flexible band. The load caused by the contact is measured with sensors connected to the element and the tension of the web is determined from the load. The problem in this solution is that for measuring, the web must be bent over the measuring element so that it touches the element. This may damage the web. When using rolls, the increasing rotation speeds and the imbalance of the roll cause disturbances in the measuring signal.

European Patent publication 0 490 971 discloses a measuring process of web tension, in which the web is brought in contact with a measuring element comprising several contiguous short rolls. Drawbacks as described above are also present in this solution.

Finnish Patent 80 522 discloses a solution, in which the tension of a moving web is measured by placing close to the web in the direction of travel of the web a measuring beam provided with a curved surface and pressure measuring cells in the holes of the beam. An air cushion is formed between the web and the curved surface, in which air pressure is comparable to the tension of the web. The tension of the web is measured by measuring the pressure of this air cushion. The solution in question provides the advantage that the web is not damaged, as the measuring beam does not touch the web. On the whole, the solution is quite functional, but somewhat complicated in its measuring arrangement.

The object of the present invention is to provide a method and apparatus, in which said drawbacks can be avoided.

SUMMARY OF THE INVENTION

The method of the invention is characterized in that the tension of the web is measured by measuring the force resulting from the web and transmitted by the measuring beam.

Further, the apparatus of the invention is characterized in that the apparatus comprises means for measuring the force resulting from the web and transmitted by the measuring beam.

An essential idea of the invention is that the tension of a web is measured by arranging the web to travel over a measuring beam which has been arranged so that the web moves over the measuring beam on an air cushion formed when the air transported by the web is pressed between the measuring beam and the web. Further, it is essential that the force caused by the tension of the web on the measuring beam is measured by measuring the force effect transmitted onward by the beam. The idea of a preferred embodiment of the invention is that the force effect transmitted by the beam is measured with weighing sensors arranged under the ends of the measuring beam. The idea of another preferred embodiment is that the force transmitted by the measuring beam is measured with strain gauges arranged on the beam.

The invention provides the advantage that as the web does not touch the measuring beam, the measuring of the tension does not damage or stress the web. The solution is also very simple in structure and measuring technique. On the whole, the adjustment accuracy of the drives and the runnability of the machine are extremely good and the number of breaks remains small.

In this application, the term "web" refers, for instance, to a paper or board web.

BRIEF DESCRIPTION OF THE DRAWINGS

The invention will be described in greater detail in the attached drawings, in which.

DETAILED DESCRIPTION OF THE PREFERRED EMBODIMENTS

Figure 1:
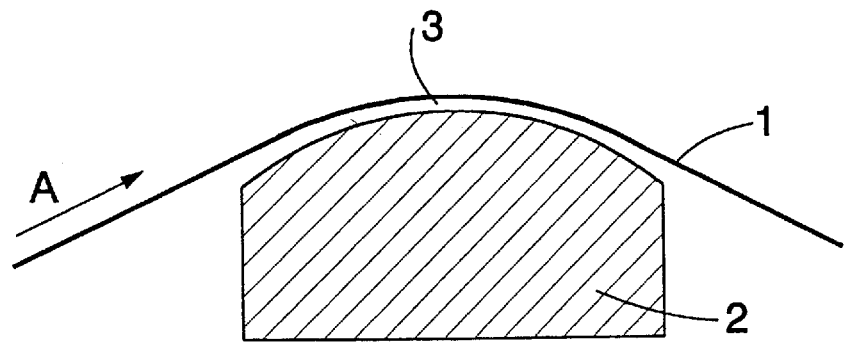
FIG. 1 is a schematic side view and cross-section of a solution of the invention and FIG. 2 shows the solution shown in FIG. 1 viewed from the direction of travel of the web and in cross-section.

FIG. 1 shows a web 1 which moves in the direction of arrow A. The web 1 has been arranged to move over a measuring beam 2. The measuring beam is made of a wear-resistant material, such as aluminium, and extends preferably substantially uniformly across the entire web 1. The surface of the measuring beam 2 against the web 1 is curved. The surface can also be formed of a surface with two or more curvature centres, of some other suitable curved surface, or in such a way that the front edge of the measuring beam 2 is a straight line at a suitable angle in relation to the web 1 and the trailing edge of the measuring beam 2 is in the shape of a circular arc. Due to the curved form, the air transported by the web 1 is pressed between the measuring beam 2 and the web 1 in such a way that the web 1 moves over the measuring beam 2 on an air cushion 3. The radius of curvature of the surface of the measuring beam 2 against the web 1 can vary, for instance, between 20 cm and one meter.

Figure 2:
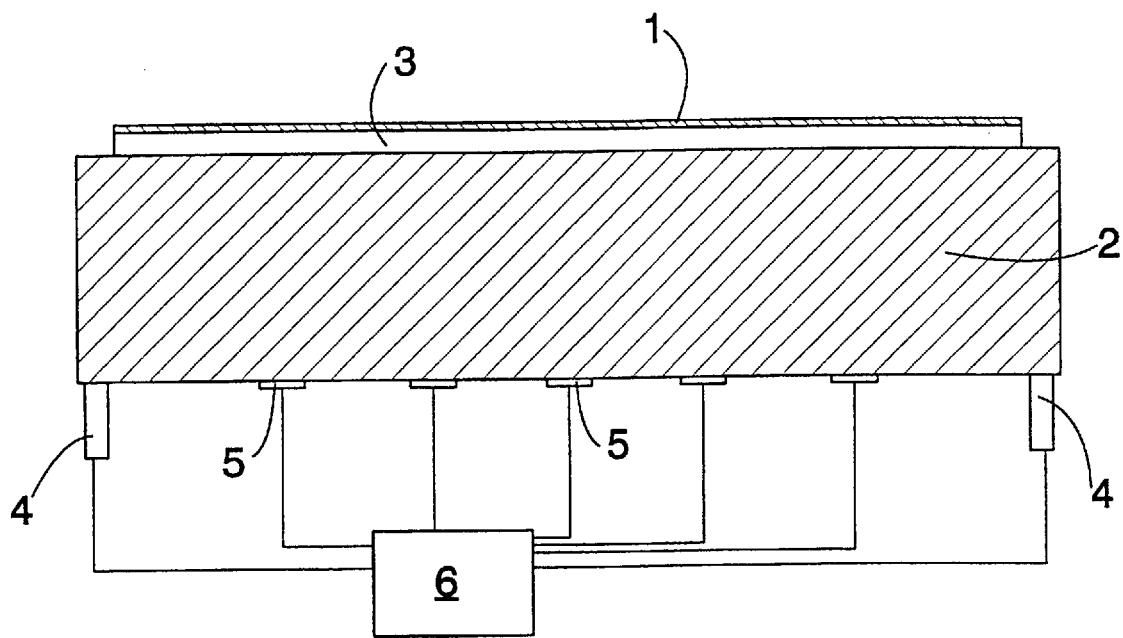

The pressure of the air cushion 3 between the web 1 and the measuring beam 2 corresponds in a balanced state quite accurately to the force caused by the tension of the web 1. The pressure of the air cushion 3 affects the measuring beam 2 and the force transmitted by the measuring beam 2 can be measured, for instance as shown in FIG. 2. With said measuring, it is possible to measure indirectly the tension of the web 1. The measuring beam 2 can be supported, for instance on its ends and weighing sensors 4 can be placed at the ends to measure the force transmitted by the measuring beam 2. Instead of or in addition to the weighing sensors 4, the force transmitted by the measuring beam 2 can be measured by placing one or more strain gauges 5 on the measuring beam 2 on the side not facing the web 1. To measure the force transmitted by the measuring beam 2, at least one strain gauge 5 placed at the point of maximum torque, i.e., in the mid-section of the measuring beam 2, is required. It is possible to increase the measuring accuracy and reliability by using several strain gauges 5. In this case, too, at least a part of the strain gauges 5 are preferably placed in the mid-section of the measuring beam. The signals produced by the weighing sensors 4 and/or the strain gauges 5 are directed to a control device 6 which defines the tension of the web 1 according to the received signals and forwards the information onward.

The drawing and the related description are only intended to illustrate the idea of the invention. The details of the invention may vary within the scope of the claims. Thus, for measurement of tension, the web 1 can also be directed under the measuring beam 2 comprising a suitably formed bottom surface.

What is claimed is:

1. A method for measuring the tension of a moving paper or board web, said method comprising the steps of:

advancing the web adjacent to an imperforate curved surface of a measuring beam such that the moving web forms a cushion of air between the web and the curved surface, said air cushion being created by air carried along with the moving web, a force being transmitted by the air cushion to the measuring beam, the measuring beam having an under surface on an opposite side of the measuring beam from the curved surface; and measuring the force transmitted to the measuring beam by the air cushion to thereby measure the tension of the web, said force being measured by at least one force-measuring sensor arranged at said under surface of the measuring beam.

2. A method as claimed in claim 1, wherein said step of measuring the force transmitted to the measuring beam is achieved with at least one weighing sensor operatively connected to the under surface of the measuring beam.

3. A method as claimed in claim 2, wherein said step of measuring the force transmitted to the measuring beam is achieved with a weighing sensor arranged at the under surface at each end of the measuring beam.

4. A method as claimed in claim 1, wherein said step of measuring the force transmitted to the measuring beam is achieved with at least one strain gauge operatively connected to the under surface of the measuring beam.

5. A method as claimed in claim 4, wherein said at least one strain gauge is placed in a mid-section of the measuring beam.

6. An apparatus for measuring the tension of a moving paper or board web, said apparatus comprising:

a measuring beam having a solid imperforate surface that is curved in a machine direction in which the web travels, the curved surface being positioned adjacent to the moving web such that the moving web forms a cushion of air between the web and the curved surface, the web causing a force to be transmitted by the air cushion to the measuring beam, the measuring beam having an under surface on a side of the measuring beam opposite from the curved surface; and at least one force-measuring sensor arranged at said under surface operable for measuring the force transmitted to the measuring beam by the air cushion to thereby measure the tension of the web.

7. An apparatus as claimed in claim 6, wherein said at least one force-measuring sensor comprises at least one weighing sensor operatively connected to the measuring beam.

8. An apparatus as claimed in claim 7, wherein a weighing sensor is arranged at the under surface at each end of the measuring beam.

9. An apparatus as claimed in claim 6, wherein the measuring beam is supported at opposite ends of the beam and said at least one force-measuring sensor comprises at least one strain gauge operatively connected to the under surface of the measuring beam for measuring bending deflection of the beam.

10. An apparatus as claimed in claim 9, wherein said at least one force-measuring sensor further comprises a plurality of strain gauges.

11. An apparatus as claimed in claim 9 wherein at least one strain gauge is placed in a mid-section of the measuring beam.

* * * * *